United States Patent [19]

Gell, Jr.

[11] 4,132,578

[45] Jan. 2, 1979

[54] PLASTIC PIPE WELDING APPARATUS AND METHOD

[76] Inventor: Harold A. Gell, Jr., 13720 Lockdale Rd., Silver Spring, Md. 20906

[21] Appl. No.: 732,984

[22] Filed: Oct. 15, 1976

[51] Int. Cl.$^2$ .................. B65H 69/02; B29C 19/00
[52] U.S. Cl. .................................. 156/158; 156/289; 156/306; 156/294; 156/583; 156/304; 264/248; 285/284; 285/423; 285/286; 285/DIG. 20; 428/36
[58] Field of Search .............. 156/156, 294, 158, 304, 156/289, 306, 296, 583; 428/36; 264/248; 285/284, 423, 286, DIG. 20, 21; 219/228; 73/363.5, 363.7

[56] References Cited

U.S. PATENT DOCUMENTS

| | | | |
|---|---|---|---|
| 2,360,950 | 10/1944 | Kilgour | 156/306 |
| 2,601,028 | 6/1952 | Kersten | 73/363.7 |
| 2,930,634 | 3/1960 | Merritt | 156/304 |
| 2,963,394 | 12/1960 | Wilkinson | 156/304 |
| 3,002,871 | 10/1961 | Tramm et al. | 285/423 |
| 3,022,209 | 2/1962 | Campbell | 156/158 |
| 3,035,958 | 5/1962 | Wilkins | 156/294 |
| 3,235,289 | 2/1966 | Jones | 156/289 |
| 3,506,519 | 4/1970 | Blumenkranz | 156/306 |
| 3,620,896 | 11/1971 | Glasgow | 156/85 |
| 3,788,928 | 1/1974 | Wise | 156/294 |

OTHER PUBLICATIONS

Hausman et al., Physics, 3rd Edition © 1948, Chapter 14, pp. 248-249.

*Primary Examiner*—William A. Powell
*Assistant Examiner*—J. J. Gallagher

[57] ABSTRACT

A method and apparatus for welding PVC pipe which includes a means to clamp and apply welding heat so that plastic pipes may be welded while under external pressure adapted to offset internal pressures. The method includes the steps of placing a clamp about a splice to be welded, tightening the clamp and applying heat through the clamp to the plastic in sufficient quantities to cause the plastic to fuse. The steps are carried out by utilizing an apparatus comprised of a clamp which is adapted to encompass the area to be welded and apply a constricting force to that area while heat is transferred through the clamping means to the plastic.

3 Claims, 5 Drawing Figures

PLASTIC PIPE WELDING APPARATUS AND METHOD

THE INVENTION

This invention relates to a method and apparatus for welding plastic pipe.

BACKGROUND OF THE INVENTION

Modern technology has provided various types of plastic pipe which have replaced the more expensive metal pipes and tubings used in residential plumbing and water supplies. These new materials are generally easier to work with than their metal counterparts but necessitate gluing of the joints. Unfortunately the failure rate of glued joints is relatively high.

To repair a glued joint in a plastic pipe requires that the joint be cut out of the pipe string and replaced by a short section with two couplings or if the leak is relatively small by a welding process which includes melting a plastic material along the edge of the coupling. To accomplish either method of repair, fluid must be removed from the pipe line. This process can be extremely time consuming and costly.

OBJECTS OF THE INVENTION

Therefore, it is an object of the present invention to provide a means to secure, or repair defective pipe joints by a welding process which does not require that fluid within the pipe string be removed.

It is a further objective of this invention to provide a method of welding plastic pipes which may be accomplished while fluid is flowing under significant pressure through the pipe line.

It is a still further object of this invention to provide an apparatus which will securely clamp a plastic pipe joint and fuse the plastic materials to form a welded seam.

The foregoing and other objectives of the invention will become apparent in light of the drawings, specifications and claims contained herein.

SUMMARY OF THE INVENTION

This invention is directed to a method of joining plastic pipes which includes placing a clamp about a new or defective joint and heating the plastic under the clamp to cause the materials to fuse together.

This invention is also directed to a clamp adapted to fit around a plastic pipe coupling in combination with an electrical heating means adapted to heat the clamp to a temperature which will cause the plastic in contact therewith to become semifluid and fuse together. In a preferred embodiment of the present invention the clamp is fabricated from bimetallic bands and heated by an inductive means. The bimetallic bands are dimensioned so that they will slip easily over a pipe joint and become significantly tight about the joint when heated. An automatic circuit interrupt means may be provided to stop the heating action when the plastic reaches a fusing temperature.

DESCRIPTION OF THE DRAWINGS

In the drawings, which illustrate the primary embodiments of the instant invention.

DESCRIPTION OF THE INVENTION

Figure 1:
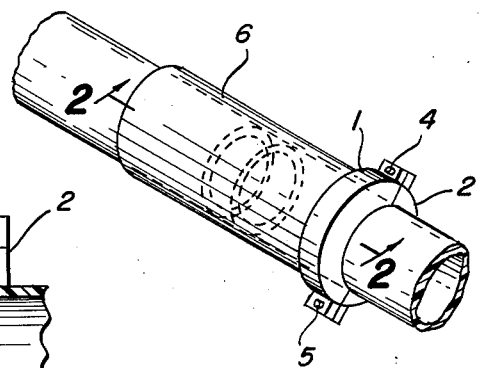
FIG. 1 is a perspective view of a basic embodiment of the present invention.
Figure 2:
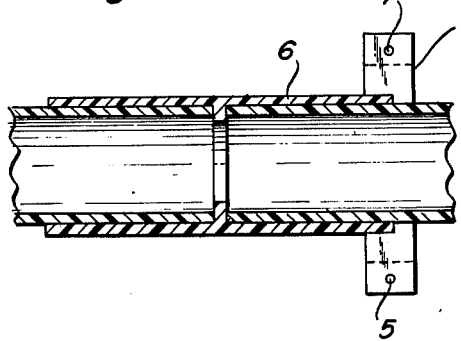
FIG. 2 is a cutaway view of the basic embodiment of the present invention shown in FIG. 1 applied to a work piece.

Referring to the drawings, FIG. 1 illustrates a basic embodiment of the invention comprised of two C-shaped clamp halves 1 and 2 which are secured and tightened about a pipe splice by screw means 4 and 5 or similar mechanical tightening means. The clamp is heated by flame, hot air, radiant energy, electromagnetic inductive energy or any suitable heat source until the plastic becomes fluid and fuses together under the pressure of the clamp. The clamp halves 1 and 2 may have a smooth inner face or they may be stepped as illustrated in FIG. 2 to permit uniform application of pressure to a pipe splice having a coupling sleeve 6.

Figure 3:
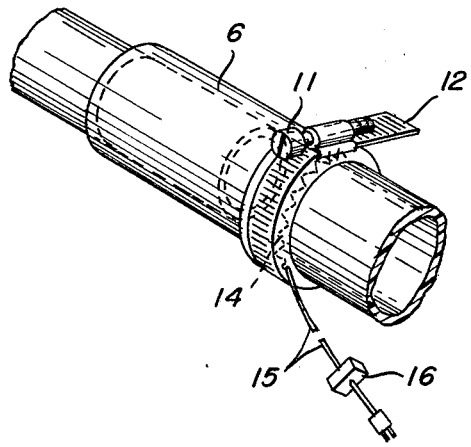
FIG. 3 is a perspective view of an alternate embodiment of the present invention.

FIGS. 3 illustrates an alternative embodiment of the instant invention which includes a screw means 11 adapted to tighten a metallic strap 12 about a plastic pipe coupling. The screw and strap combination may be provided by a common hose clamp but a smooth slidable inner strap must be provided if the clamp has serrations or slots in the portion of the strap which would contact the coupling. A resistance heating element 14 is secured to the strap 12 to provide the heat required to fuse the plastic contained by the clamp. The heating element may be in the form of a flexible inner liner or it may be placed on the outer surface of the clamp. An electrical cord 15 including an on-off switch 16 is connected to the resistance heating element to provide a means by which the device may be controllably energized from a source of electricity.

Figure 4:
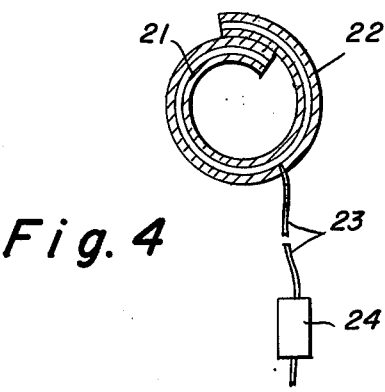
FIG. 4 is an end view of an embodiment of the present invention illustrating the use of a bimetallic clamp.

FIG. 4 discloses an alternate embodiment of the instant invention wherein the clamp is formed from a bimetallic strap 21. The bimetallic strap may have a resistance heating wire fastened to the outside as in the embodiment illustrated in FIG. 3 or it may be provided with an inductive heating element 22 contained in a flexible housing about the outer periphery of the bimetallic strap. A cable 23 is provided to connect the heating element to a suitable source of power which may be controlled by a switching means 24.

The embodiment illustrated in FIG. 3 is used to weld plastic pipes by opening the clamp, placing it about a joint to be welded, securely tightening the screw means 11 to place a positive pressure on the pipe joint and applying electrical current to the heating means until the plastic under the clamp becomes fluid enough to fuse. If desired, a filler plastic material in the form of a plastic wire or rod 31 of FIG. 2 may be wrapped about the joint prior to placing the clamp thereon. To ensure that the plastic does not stick to the inside of the clamp, a silicone based oil 33 may be applied to the mmetallic surfaces.

The embodiment illustrated in FIG. 4 is used by simply spreading the clamp open, placing it over a joint to be welded, and allowing it to close about the joint. A filler rod or wire may be wrapped about the joint prior to placing the clamp thereon. The interface of the clamp and pipe in all embodiments may be coated with a silicone oil 33 or similar release agent to ensure that the clamp will not stick to the welded joint. Power is then applied to the heating element and as the clamp heats up the bimetallic band tightens about the joint due to the different coefficient of expansion of the materials of the bimetallic strip. When the plastic has reached a fluid state and is completely fused, the electrical energy is turned off and the device is allowed to cool until such time that the bimetallic clamp relaxes and may be removed.

Figure 5:
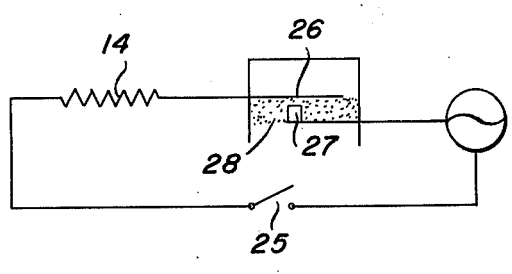
FIG. 5 is an electrical circuit diagram illustrating the automatic interrupt feature.

The embodiments illustrated in FIGS. 3, 4 may be controlled by a circuit similar to that shown in FIG. 5. If this control circuit is used, the normally open switch comprised of contacts 26 and 27 is incorporated into the inner surface of the clamp in recess 32. The arm associated with is formed of a spring material adapted to urge the contacts apart, or alternately a high temperature resistant sponge material 28 may be used to urge the contacts apart.

The strength of whatever means is used to urge contacts 26 and 27 apart is selected so that the contacts will be closed when the clamp is initially placed about the pipe splice, but as the internal pressure of the clamp decreases due to fluid flow of the melting plastic, the contacts will open as contact 27 emerges from recess 32.

The operation of the automatic embodiments is as follows: The clamp is placed about the pipe splice and tightened either by mechanical means, bimetallic means or by spring tension. This closes contacts 26 and 27 which permits current to flow through the heater 14 when switch 25 is closed. As the plastic becomes fluid, the pressure holding contacts 26 ad 27 together decreases and they open, turning off the heater 14. In the bimetallic embodiment, this occurs after the maximum differential expansion has been achieved.

In other embodiments of the invention the metal clamps of FIGS. 1, 3 or 4 may be heated by a magnetic induction heating means.

Further embodiments of this invention encompass the concepts of heating the mechanically tightened clamps or bimetallic clamp by directing a flame against the clamp or directing heated air or fluid against the clamp, providing clamps having plural diameters to accommodate stepped pipes or pipes having splicing collars etc., thereon and lining the clamps with Teflon or a similar heat resistant release material.

While several embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A method of welding a plastic pipe which includes the steps of:
    bringing together two separate pieces of plastic pipe to be welded to form a splice; placing a bimetallic clamp about said splice; and applying heat to said bimetallic clamp in sufficient quantities to cause said bimetallic clamp to tighten about said splice and to cause the plastic thereunder to fuse.

2. A method as described in claim 1 including the additional step of:
    applying a release agent to the inner surface of said bimetallic clamp before applying said bimetallic said splice clamp to.

3. A method as defined in claim 1 further including the step of applying a plastic filler rod to the plastic pipe to be welded prior to applying said bimetallic clamp.

* * * * *